Patented Dec. 5, 1933

1,938,081

UNITED STATES PATENT OFFICE 1,938,081

MANUFACTURE OF YEAST

Ejnar Alfred Meyer, Epsom, England, assignor to Standard Brands Incorporated, Dover, Del., a corporation of Delaware No Drawing. Application May 3, 1930, Serial No. 449,678, and in Great Britain May 1, 1929

5 Claims. (Cl. 195—20)

All existing methods of continuous growing of yeast, that is, the processes of manufacture in which there is a continuous addition of nutrients with a continuous withdrawal of yeast, have failed to prove entirely successful hitherto owing to the fact that it has been found impossible to prevent, at some period or other, the invasion of the fermenting liquid by undesirable organisms. The gradual accumulation of these organisms always produces a degeneration in the quality of the yeast obtained, so that it is necessary to stop the process and re-start the operations.

It is, of course, the usual procedure in discontinuous methods of yeast manufacture to add sufficient quantity of either a mineral acid or an organic acid to inhibit the growth of foreign organisms, but it has been found that when this acidity has to be maintained throughout a long period the yeast after a time becomes sluggish in growth and, moreover, tends to deteriorate in quality.

The present invention consists essentially in maintaining conditions in the fermenting mash such that the growth of undesirable organisms, such as torula yeasts, moulds, mycoderma and bacteria is inhibited continuously without affecting the growth or quality of the yeast. I have found that these partially sterile conditions of the mash can be obtained by the use of certain substances which, in the concentrations employed, stimulate the action of the yeast growth but destroy undesirable organisms. Such substances are the halogens, such as chlorine, organic halogenated derivatives, such as chloramine T, halogenated hydrocarbons, formaldehyde and alkaloids and their derivatives such as pyridine, nicotine, etc. The sterilizing substances may be added continuously or periodically to the fermenting mash either together with the nutrients or, alternatively, together with the water which is added to the fermenters.

As it is essential that the air used for aerating the mash should be passed through a sterilizing agent before use, the material used according to the present invention for protecting the yeast may be introduced into the mash together with the air, as for example, in the case of a volatile protective material (such as chlorine), by passing through a solution of the volatile protecting substance.

In order that the invention may be clearly understood and readily carried into effect, I will now describe the same more fully with reference to two specific examples.

Example I

Molasses wort containing 200 kilos of molasses per 1000 litre is clarified by known methods and stored in a container ready for controlled transfer to a fermenter. This relatively strong wort is chlorinated in any convenient way. It may for example be chlorinated by adding saturated chlorine water to the extent of about 5 ccs. per litre which produces in the wort a chlorine concentration of about 0.02 grams per litre, or it may be chlorinated as it enters the wort container as by leading chlorine gas into the pipe through which the wort passes to the container, the stream of chlorine being so adjusted that the concentration of chlorine in the wort is about 0.02 grams per litre.

A fermenter is charged with about 60 litres of the clarified strong molasses wort chlorinated as above described and with about 1000 litres of water which has also been treated with chlorine gas or chlorine water to give a chlorine concentration in the water of not more than about 0.02 grams per litre.

In a separate vessel about 16 kilos of seed yeast are suspended in 20 litres of water which is preferably chlorinated to the extent of 0.05 or less grams of chlorine per litre, and this suspension is allowed to stand for a short time, after which it is added to the dilute chlorinated molasses wort in the fermenter.

Aeration is then commenced and the clarified and chlorinated molasses wort of the concentration above described, and also the usual nutrient salts necessary for the development of the yeast, are added to the fermenter according to the usual continuous-addition process, for example at a rate of 55 to 60 litres of wort per hour. Preferably the water in which the nutrient salts are dissolved is chlorinated as well as the molasses wort.

When the concentration of yeast in the fermenter is considered adequate, for example, when it has reached 60 grams of yeast per litre, a certain amount of the yeast-containing-wort is continuously withdrawn from the fermenter and passed to the yeast separators while a corresponding bulk of the chlorinated molasses wort, the nutrients and the chlorinated water or centrifuged wash is continuously added to the fermenter. In this way the total bulk of liquid in the fermenter and the concentration of yeast therein is kept constant notwithstanding the continuous withdrawal of yeast.

The chlorination of all of the constituents secures freedom from infection and enables yeast of high quality to be produced in a continuous manner.

*Example II*

Molasses wort is prepared as in Example I.

Bleaching powder (that is to say calcium hypochlorite) is stirred into the wort to the extent of 0.05 to 0.1 grams per litre. The addition of the bleaching powder gives rise to the formation of active chlorine.

60 litres of the chlorinated wort are now mixed in the fermenter with 1,000 litres of water which has also been treated with bleaching powder to the extent of 0.05 to 0.1 grams per litre. The necessary seed yeast is prepared by stirring 18 kilos of seed yeast in water containing 0.05 grams of chlorine per litre and is then added to the fermenter and aeration is started.

Chlorinated molasses wort of the concentration specified and a solution of the usual nutrient salts, either or both of which may be chlorinated, are then added to the fermenter at the rate of for example 60 to 70 litres of the wort per hour until the concentration of yeast has arrived at for instance 40 grams per litre.

Yeast-containing-wort is then continuously withdrawn from the fermenter and centrifuged and a corresponding bulk of the chlorinated wort, nutrients and water as in Example I is added.

The term "continuous" as used throughout the foregoing description and in the appended claims is to be construed as implying not only actual continuity by also intermittent or periodic action as it is obvious that the withdrawals from and additions to the fermenter may be effected at frequent intervals.

Having now particularly described and ascertained the nature of my said invention and in what manner the same is to be performed, I declare that what I claim is:—

1. A process of manufacturing yeast comprising, in combination, propagating yeast in a nutrient liquid in a fermenter to which is continuously added one or more solutions containing yeast nutrient materials and from which is continuously withdrawn yeast containing liquid, at least one of said added solutions containing a substance which in the fermenter maintains a condition inhibiting the growth of undesirable organisms.

2. A process of manufacturing yeast comprising, in combination, propagating yeast in a nutrient liquid in a fermenter to which is added one or more solutions containing yeast nutrient materials and from which is withdrawn yeast containing liquid, at least one of said added liquids having chlorine dissolved therein in an amount sufficient to maintain in the fermenter a condition inhibiting the growth of undesirable organisms.

3. A process of manufacturing yeast comprising, in combination, propagating yeast in a nutrient liquid in a fermenter to which is continuously added one or more solutions containing yeast nutrient materials and from which is continuously withdrawn yeast containing liquid, at least one of said added liquids having chlorine dissolved therein in an amount sufficient to maintain in the fermenter a condition inhibiting the growth of undesirable organisms.

4. A process of manufacturing yeast comprising, in combination, propagating yeast in a dilute nutrient liquid in a fermenter, adding thereto at least one relatively concentrated solution containing yeast nutrients, and water, and withdrawing therefrom yeast containing liquid, the water having chlorine dissolved therein in an amount sufficient to maintain in the fermenter a condition inhibiting the growth of undesirable organisms.

5. A process of manufacturing yeast, comprising in combination, propagating yeast in a nutrient liquid in a fermenter to which is continuously added a solution containing yeast nutrient materials and from which yeast containing liquid is continuously withdrawn, and continuously adding a substance to the propagating liquid which in the fermenter maintains a condition inhibiting the growth of undesirable organisms.

EJNAR ALFRED MEYER.